United States Patent
Choi

(10) Patent No.: US 8,904,898 B2
(45) Date of Patent: Dec. 9, 2014

(54) ELECTRONIC SHIFT LEVER FOR IMPROVING OPERABILITY IN AUTOMATIC TRANSMISSION

(75) Inventor: Jeehyuck Choi, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 306 days.

(21) Appl. No.: 13/488,185

(22) Filed: Jun. 4, 2012

(65) Prior Publication Data

US 2013/0145887 A1 Jun. 13, 2013

(30) Foreign Application Priority Data

Dec. 13, 2011 (KR) .................... 10-2011-0133768

(51) Int. Cl.
 *B60K 20/00* (2006.01)
 *G05G 5/00* (2006.01)
 *G05G 5/08* (2006.01)

(52) U.S. Cl.
 USPC .................... 74/473.21; 74/473.26

(58) Field of Classification Search
 CPC ... F16H 61/22; F16H 59/0204; F16H 59/105; F16H 59/0278; F16H 2061/223; F16H 2059/0282; F16H 2059/026; F16H 2059/0295; B60K 20/02
 USPC .............. 74/473.1, 473.21, 473.23, 473.24, 74/473.25, 473.26, 473.3, 473.33, 473.34, 74/473.35, 471 XY, 523, 524, 526, 554; 200/5 R; 345/161
 See application file for complete search history.

(56) References Cited

U.S. PATENT DOCUMENTS

| | | | |
|---|---|---|---|
| 6,448,670 B1 * | 9/2002 | Onodera et al. ............ | 307/10.1 |
| 6,848,332 B2 | 2/2005 | Hayashi et al. | |
| 7,086,306 B2 * | 8/2006 | Syamoto et al. ........... | 74/473.33 |
| 7,293,480 B2 * | 11/2007 | Matsui et al. .............. | 74/473.12 |
| 2004/0216547 A1 * | 11/2004 | Shiomi et al. .................. | 74/335 |
| 2006/0283276 A1 * | 12/2006 | Komatsu et al. ............... | 74/335 |
| 2010/0116075 A1 * | 5/2010 | Moreno Colom et al. . | 74/473.12 |
| 2010/0242656 A1 * | 9/2010 | Kino .......................... | 74/473.12 |
| 2011/0057909 A1 * | 3/2011 | Itoh ............................... | 345/184 |
| 2011/0126658 A1 * | 6/2011 | Wittorf ..................... | 74/473.15 |
| 2011/0132122 A1 * | 6/2011 | Park et al. ................. | 74/473.12 |

FOREIGN PATENT DOCUMENTS

| | | |
|---|---|---|
| JP | 05-229360 A | 9/1993 |
| JP | 2002-248959 A | 9/2002 |
| JP | 2008518845 A | 6/2008 |
| JP | 2011-218851 A | 11/2011 |
| KR | 20060114746 A | 11/2006 |
| KR | 10-2007-0005054 A | 1/2007 |
| KR | 10-0726546 B1 | 6/2007 |
| KR | 10-0751688 B1 | 8/2007 |
| KR | 10-0936751 B1 | 1/2010 |

* cited by examiner

*Primary Examiner* — Troy Chambers
*Assistant Examiner* — Jake Cook
(74) *Attorney, Agent, or Firm* — Morgan, Lewis & Bockius LLP

(57) ABSTRACT

An electronic shift lever apparatus of an automatic transmission improving operability which may be provided in a room of a vehicle adopting the automatic transmission, may include a base having a lower member fixed to the vehicle and an upper member positioned above the lower member, a frame engaged to the upper member and horizontally slidable with respect to the upper member, a shift lock controlling device disposed between the frame and the upper member of the base and selectively locking the frame to the base, and an upper cover positioned above the frame, slidable vertically, and selectively unlocking the shift lock controlling device which controls an engaging state of the frame to the base.

6 Claims, 7 Drawing Sheets

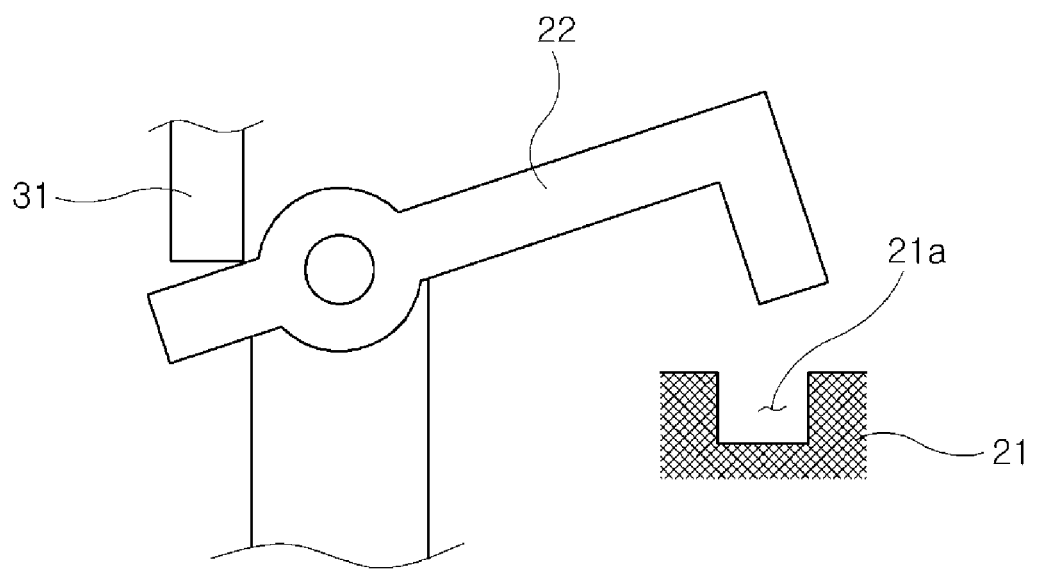

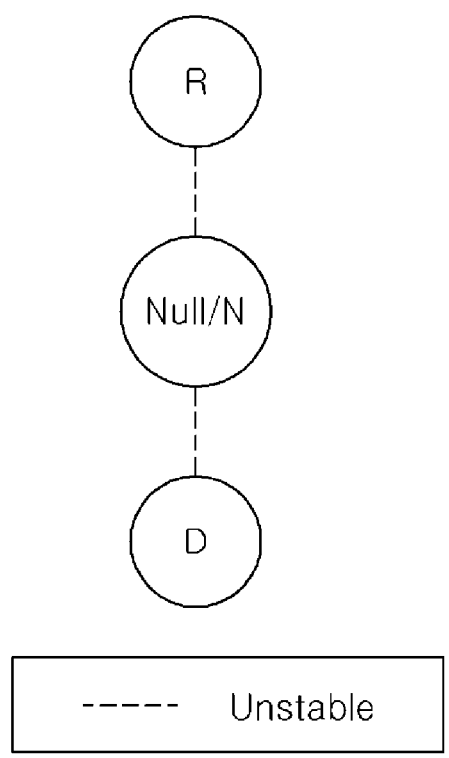

ELECTRONIC SHIFT LEVER FOR IMPROVING OPERABILITY IN AUTOMATIC TRANSMISSION

CROSS-REFERENCE TO RELATED APPLICATIONS

The present application claims priority to Korean Patent Application Number 10-2011-0133768 filed Dec. 13, 2011, the entire contents of which application is incorporated herein for all purposes by this reference.

BACKGROUND OF THE INVENTION

1. Field of the Invention

The present invention relates to an electronic shift lever of an automatic transmission, and more particularly, to an electronic shift lever of an automatic transmission that improves operability in such a manner that an operating method is simplified in a shift operation and that an operating distance and operating force are reduced.

2. Description of Related Art

In recent years, an automatic transmission is mounted on most of vehicles for shifting a gear.

The automatic transmission is operated to a shift range which a driver desires by a shift lever provided indoor.

The electronic shift lever of the automatic transmission in the related art as one of the example has a shape as shown in FIG. 1. The electronic shift lever 100 of the automatic transmission passes through range N in order to shift from an initial position to range R or range D and thereafter, the shift lever is moved forward or backward so as to be shifted from range R to range D.

In the electronic shift lever of the automatic transmission in the related art, since the initial state has to be moved to range N and thereafter, moved to range R or range D as shown in FIG. 2, an operating distance is increased. Further, when the operating distance of the shift lever is increased, operating force is also increased and it is disadvantageous in designing a package in a vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an electronic shift lever of an automatic transmission improving operability that can shift a shift lever to range N without moving the shift lever at an initial position.

In an aspect of the present invention, an electronic shift lever apparatus of an automatic transmission improving operability which is provided in a room of a vehicle adopting the automatic transmission, may include a base having a lower member fixed to the vehicle and an upper member positioned above the lower member, a frame engaged to the upper member and horizontally slidable with respect to the upper member, a shift lock controlling device disposed between the frame and the upper member of the base and selectively locking the frame to the base, and an upper cover positioned above the frame, slidable vertically, and selectively unlocking the shift lock controlling device which controls an engaging state of the frame to the base.

The shift lock controlling device may include a locking groove formed in a locking block which is formed integrally with the frame, and a locking lever rotatably provided on the upper member of the base, wherein an end of the locking lever is selectively unlocked from the locking groove while another end of the locking lever is actuated by a vertical movement of the upper cover.

The shift lock controlling device may further include a support leg fixed to the upper member of the base and pivotally supporting the locking lever, and a guide groove formed to the locking block to receive the support leg therein.

The electronic shift lever apparatus of the automatic transmission improving operability may further include a return groove recessed from the top of the upper member to be deeper toward the center from the periphery of the upper member, a finger of which a lower end is formed to move along the return groove, and a finger spring disposed between the upper cover and the finger and elastically biasing the finger toward the return groove of the upper member.

A guide guiding the upper cover to slide in a vertical direction of the frame is provided in the frame.

An N-range switch that is actuated in contact with the bottom of the upper cover when the upper cover move down, is provided in the upper member of the base.

A spring housing is formed on the bottom of the upper cover, and the spring housing receives an upper part of the finger spring therein, a lower end of the spring housing contacts the another end of the locking lever and the N-range switch, and as a result, when the spring housing moves down, the locking lever and the N-range switch are actuated.

The electronic shift lever apparatus may further include a rotation shaft pivotally coupled to the frame and having a support block having a flat upper surface, and an elastic member disposed between the upper cover and the support block such that when the rotation shaft is rotated in a predetermined angle, the upper cover is tilted with respect to the frame.

According to an electronic shift lever of an automatic transmission improving operability of an exemplary embodiment of the present invention, N-range shifting is achieved only by pressing a shift lever at an initial position, and as a result, the operability is improved by reducing an operating distance and operating force as compared with achieving N-range shift by moving the shift lever at the initial position in the related art.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIGS. 6 and 7 are side view showing an operating principle of a locking lever in the electronic shift lever according to the exemplary embodiment of the present invention.

FIG. 8 is an operating line diagram of the electronic shift lever according to the exemplary embodiment of the present invention.

Figure 1:
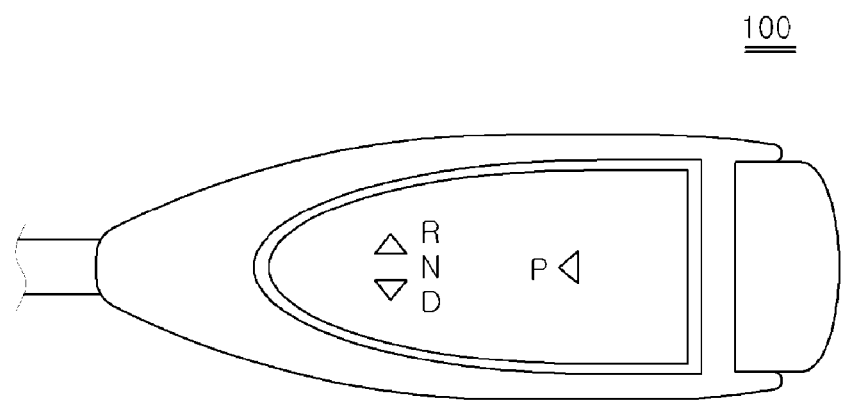
FIG. 1 is a plan view showing one example of an electronic shift lever in the related art.
Figure 2:
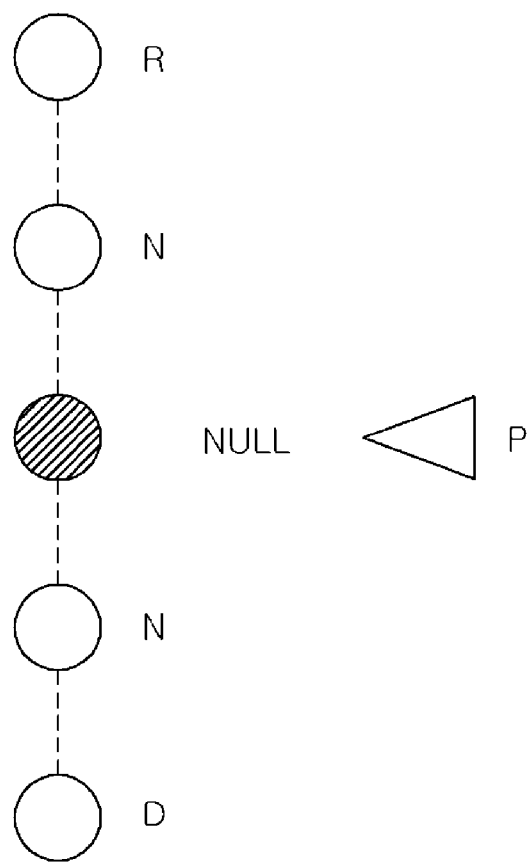
FIG. 2 is an operating line diagram of the electronic shift lever in the related art.
Figure 3:
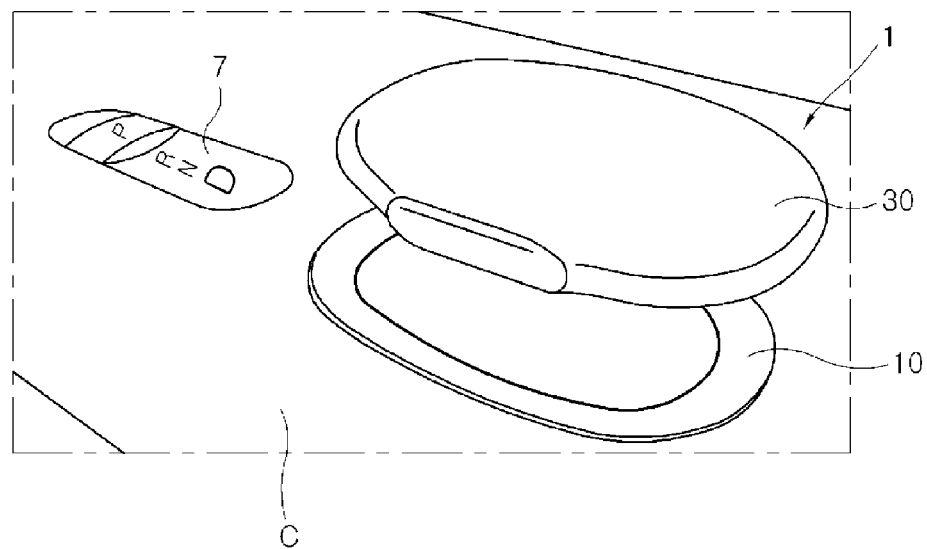
FIG. 3 is a perspective view showing an electronic shift lever according to an exemplary embodiment of the present invention, in which the reference numeral "7" denotes an indicator that indicates shift range or ranges of a transmission and the reference character "C" denotes a console.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an electronic shift lever of an automatic transmission improving operability according to an exemplary embodiment of the present invention will be described in detail with reference to the accompanying drawings.

The electronic shift lever of an automatic transmission for improving operability according to the exemplary embodiment of the present invention, which is provided in a room of a vehicle adopting the automatic transmission, includes a base 10 constituted by a lower member 11 fixed to the vehicle and an upper member 12 positioned above the lower member 11, a frame 20 provided to be slidable with reference to the upper member 12 positioned therein and including a shift lock controlling device selectively locking or releasing a shift, and an upper cover 30 positioned above the frame 20, slidable vertically, and releasing the shift lock controlling device when the upper cover 30 is moved down by an operation.

A base 10 is fixed to the room of the vehicle. For example, a lower part of the base 10 is mounted on a console of the vehicle, such that a shift lever 1 according to an exemplary embodiment of the present invention is provided so to be exposed to the console.

The base 10 includes a lower member 11 fixed to the vehicle and the upper member 12 having other components above upper member 1. The lower member 11 and the upper member 12 are connected through a connection member 13. Therefore, the base 10 is substantially fabricated in a shape of the letter U rotated at 90°.

A bottom of the lower member 11 is formed so as to be appropriated to a shape of an inner surface the base installed in the vehicle.

Meanwhile, an upper surface of the upper member 12 is substantially flat and a return groove 12a is formed in the middle of the upper member 12 along a movement direction of the frame 20. The return groove 12a is formed to be deep toward the center of the periphery thereof. The return groove 12a interacts with a finger 32 to return the shift lever 1 to an initial position when an operating of the shift lever 1 is completed. The return groove 12a will be described below in detail.

An N-range switch 14 configured to switch the automatic transmission to range N is provided at one side of the upper member 12. When an N-range switch 14 is pressed, a TCU performs N-range shifting.

The frame 20 receives the upper member 12 and has the shift lock controlling device therein, and is provided to slide on the base 10.

The frame 20 receives the upper member 12 of the base 10 therein. For example, a through-hole is formed at one side of the frame 20 which is slightly concave on the whole and when the upper member 12 is assembled through the through-hole, the connection member 13 is positioned in the through-hole, and as a result, the upper member 12 may be received in frame 20.

The frame 20 is provided to slide on the upper member 12 of the base 10 to slide unidirectionally with respect to the base. That is, frame is connected with base 10 to move vertically and horizontally, such that the frame 20 is elevatable or slidable with respect to the upper member 12 of the base 10.

The shift controlling means is provided to disable or enable shifting according to an operation of the shift lever 1.

Figure 4:
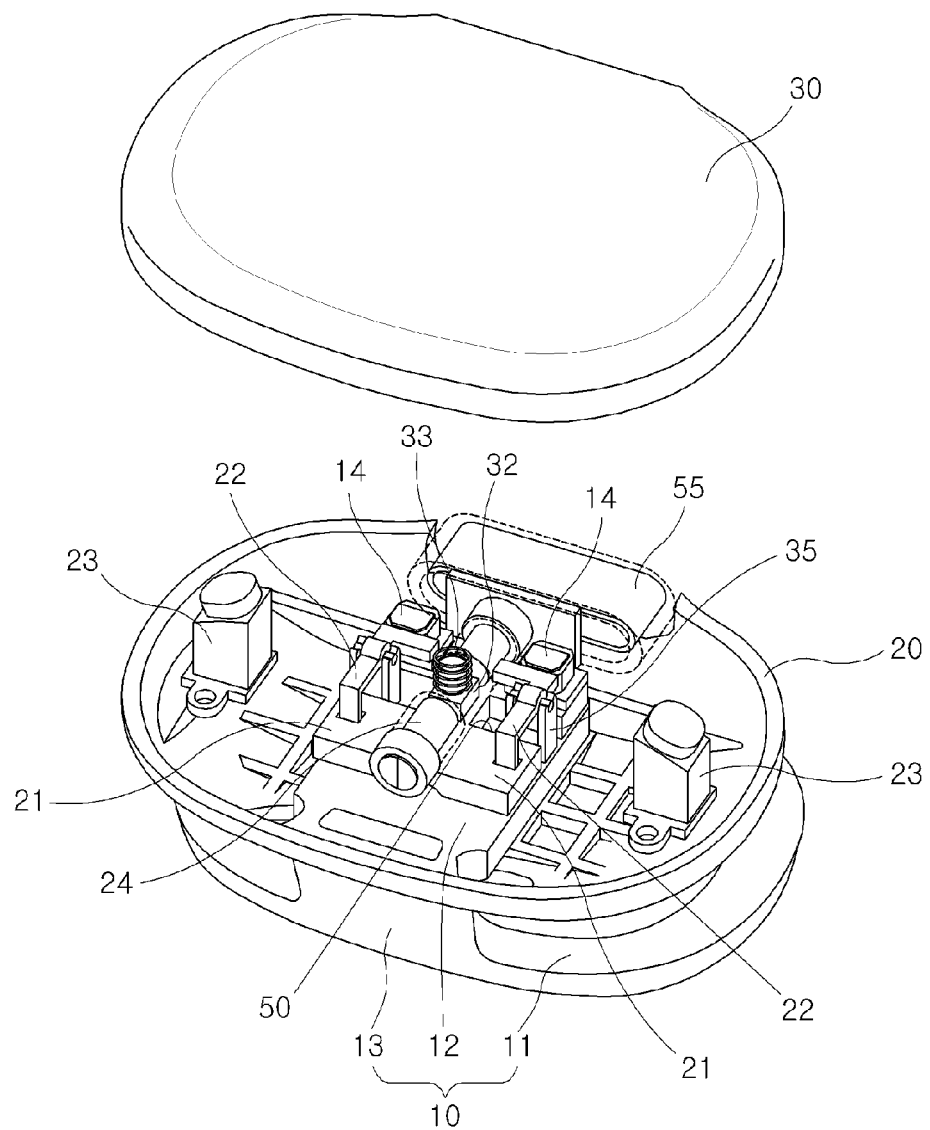
FIG. 4 is a perspective view showing a state in which an upper cover is removed from the electronic shift lever according to the exemplary embodiment of the present invention.
Figure 5:
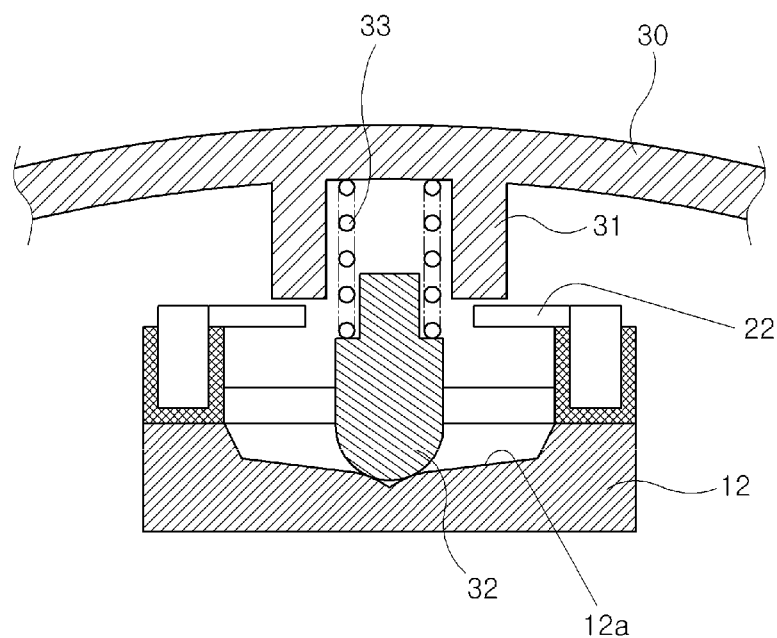
FIG. 5 is a cross-sectional view showing a principle in which the shift lever is operated and thereafter, restored in the electronic shift lever according to the exemplary embodiment of the present invention.
Figure 6:
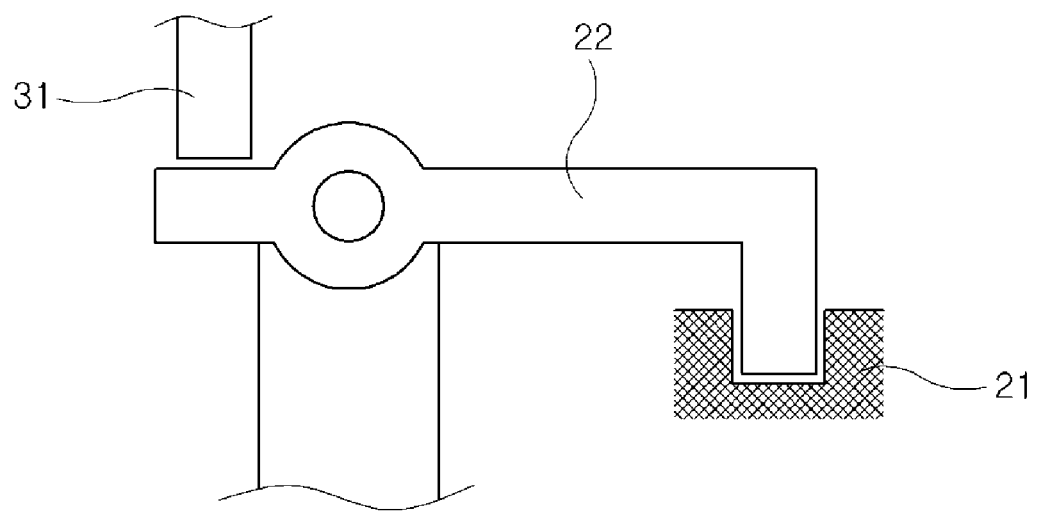

As one of the detailed examples, a locking groove 21a and a locking lever 22 may be used in the exemplary embodiment of the present invention. The locking lever 22 is rotatably provided on the upper member 12, one end of the locking lever 22 may be moved down by the upper cover 30 to be described below, and the other end of the locking lever 22 is inserted into or separated from the locking groove 21a, such that the shift lock operation is actuated or cancelled. That is, when the other end of the locking lever 22 rotatably provided in the base 10 is inserted into the locking groove 21a formed in the locking block 21 which operates integrally with the frame 20, the shift lock that prevents the frame 20 from moving by restraining the base 10 and the frame 20 operates and when the other end of the locking lever 22 is separated from the locking groove 21a, the restraint between the base 10 and the frame 20 is cancelled, and as a result, the shift lock is also cancelled. Even though the locking block 21 is shown as if the locking block 21 is separated from the frame 20 in FIG. 4, FIG. 4 shows a schematic internal structure of the locking block 21 and the locking block 21 is substantially formed integrally with the frame 20, such the locking block 21 operates together with the frame 20.

In an exemplary embodiment of the present invention, the shift controlling device may further include a support leg 35 attached to the upper member 12 and pivotally supporting the locking lever 22. The locking block 21 may include a guide groove 50 to receive the support leg 35 such that while the locking block 21 fixed to the frame 20 moves horizontally, the support leg 35 fixed to the upper member 12 does not have interference with the locking block 21.

The upper cover 30 is provided to be elevatable by sliding on the top of the frame 20 vertically. The upper cover 30 forms an upper contour of the shift lever 1 of the exemplary embodiment of the present invention and when the upper cover 30 is moved down by the operation, one side of the bottom of the upper cover 30 presses the N-range switch 14 and the locking lever 22 to the actuate N-range switch 14 and the locking lever 22.

A spring housing 31 which is opened downward is formed on the bottom of the upper cover 30 and a finger spring 33 provided as a coil spring which is subjected to compression is provided in the upper cover 30.

The finger spring 33 elastically supports a finger 32 provided vertically on the return groove 12a, such that when an external force applied to the shift lever 1 is removed by interaction of the finger 32 and 12a, the shift lever 1 returns to an initial position.

The finger 32 is disposed vertically and an upper portion of the finger 32 is elastically supported downward by the finger spring 33 and a lower end of finger 32 is provided to contact the return groove 12a formed in the base 10. Since the finger is elastically supported downward, the lower end of the finger 32 continuously tends to move to a deepest portion in the return groove 12a, i.e., the center of the return groove 12a. Since a profile of the return groove 12a is inclined to be deeper toward the center from the periphery, the lower end of the finger 32 moves to the center of the return groove 12a when the external force is removed, and as a result, the shift lever 1 is returned.

Since the upper cover 30 elevates, a plurality of guides 23 are provided in the frame 20 in order to guide the elevation of the upper cover 30 to guide the elevation of the upper cover 30.

The rotation shaft 24 is pivotally coupled to the frame 20 and a handle 55 is fixed to the rotation shaft 24.

An operation of the electronic shift lever of an automatic transmission according to the exemplary embodiment of the present invention having the above configuration will be described.

The shift lever 1 of an automatic transmission according to an exemplary embodiment of the present invention is shifted to range N while being moving down by a driver's pushing operation and electronic shift lever 1 moves down and thereafter, moves forward or backward, and as a result, electronic shift lever 1 is shifted to range R and range D.

First, in an initial state which is a state before a driver presses the shift lever 1, that when the transmission is in range P, the other end of the locking lever 22 is inserted into the locking groove 21a, resulting in an actuation state of the shift lock in which the frame 20 cannot slide with respect to the base 10. The other end of the locking lever 22 provided in the base 10 is inserted into the locking groove 21 formed in the frame 20, and as a result, the frame 20 cannot slide with respect to the base 10.

When the driver presses shift lever 1, one side of the spring housing 31 presses the N-range switch 14 while the upper cover 30 moves down. When the N-range switch 14 is pressed, a TCU shifts the automatic transmission to range N from a pre-shifting state.

When the shift lever 1 is pressed, the shift lock is also cancelled. While the upper cover 30 moves down, the spring housing 31 presses one end of the locking lever 22 to rotate the locking lever 22. When one end of the locking lever moves down to rotate the locking lever 22, the other end of the locking lever 22 moves up contrary thereto, and as a result, the other end of the locking lever 22 is separated from the locking groove 21a. When the other end of the locking lever 22 is separated from the locking groove 21a, the frame 20 is subject to a state in which the frame 20 is movable with respect to the base 10, i.e., the state in which the shift lock is cancelled.

Accordingly, when the driver presses the upper cover 30, N-range switch 14 is actuated, such that the transmission is shifted to range N and the other end of the locking lever 22 is separated from the locking groove 21a to become a state in which shifting is available, i.e., the state in which the shift lock is cancelled.

Meanwhile, as described above, after the shifting operation to range N, D, or R from the initial position by the push or the push and sliding and thereafter, the shift lever 1 returns to an original position without an additional operation.

For example, after the shift lever 1 is shifted to range R or D by the push and sliding operations, the finger 32 elastically supported on the upper cover 30 returns the shift lever 1 to the original position. If not range N, the finger spring 33 presses the finger 32 by elastic force. Accordingly, since the lower end of the finger 32 tends to be positioned at the deepest portion of the return groove 12a, the upper cover 30 may return to the initial position.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic shift lever apparatus of an automatic transmission improving operability which is provided in a room of a vehicle adopting the automatic transmission, the electronic shift lever apparatus comprising:
    a base having a lower member fixed to the vehicle and an upper member positioned above the lower member;
    a frame engaged to the upper member and horizontally slidable with respect to the upper member;
    a shift lock controlling device disposed between the frame and the upper member of the base and selectively locking the frame to the base; and
    an upper cover positioned above the frame, slidable vertically, and selectively unlocking the shift lock controlling device which controls an engaging state of the frame to the base;
    wherein the shift lock controlling device includes:
        a locking groove formed in a locking block which is formed integrally with the frame; and
        a locking lever rotatably provided on the upper member of the base, wherein an end of the locking lever is selectively unlocked from the locking groove while another end of the locking lever is actuated by a vertical movement of the upper cover.

2. The electronic shift lever apparatus of the automatic transmission improving operability as defined in claim 1, wherein the shift lock controlling device further includes:
    a support leg fixed to the upper member of the base and pivotally supporting the locking lever; and
    a guide groove formed to the locking block to receive the support leg therein.

3. The electronic shift lever apparatus of the automatic transmission improving operability as defined in claim 1, further comprising:
    a return groove recessed from the top of the upper member to be deeper toward the center from the periphery of the upper member;

a finger of which a lower end is formed to move along the return groove; and a finger spring disposed between the upper cover and the finger and elastically biasing the finger toward the return groove of the upper member.

4. The electronic shift lever apparatus of the automatic transmission improving operability as defined in claim 1, wherein a guide guiding the upper cover to slide in a vertical direction of the frame is provided in the frame.

5. The electronic shift lever apparatus of the automatic transmission improving operability as defined in claim 3, wherein an N-range switch that is actuated in contact with the bottom of the upper cover when the upper cover is moved down, is provided in the upper member of the base.

6. The electronic shift lever apparatus of the automatic transmission improving operability as defined in claim 5, wherein:

a spring housing is formed on the bottom of the upper cover, and the spring housing receives an upper part of the finger spring therein, a lower end of the spring housing contacts the another end of the locking lever and the N-range switch, and as a result, when the spring housing moves down, the locking lever and the N-range switch are actuated.

\* \* \* \* \*